US012333259B2

(12) United States Patent
Hines (10) Patent No.: US 12,333,259 B2
(45) Date of Patent: Jun. 17, 2025

(54) MULTILINGUAL CONVERSATIONAL SEMANTIC PROCESSOR

(71) Applicant: GENERAL SOFTWARE CORPORATION, Toronto (CA)

(72) Inventor: Vaughan Hines, Toronto (CA)

(73) Assignee: ADDERBEE RESEARCH CORPORATION, Toronto (CA)

( * ) Notice: Subject to any disclaimer, the term of this patent is extended or adjusted under 35 U.S.C. 154(b) by 253 days.

(21) Appl. No.: 17/984,682

(22) Filed: Nov. 10, 2022

(65) Prior Publication Data

US 2023/0144754 A1    May 11, 2023

(30) Foreign Application Priority Data

Nov. 10, 2021  (CA) ...................................... 3138451

(51) Int. Cl.
*G06F 40/35*      (2020.01)
*G06F 40/284*    (2020.01)

(52) U.S. Cl.
CPC ............ *G06F 40/35* (2020.01); *G06F 40/284* (2020.01)

(58) Field of Classification Search
CPC ............................... G06F 40/35; G06F 40/284
USPC ......................................... 704/231, 239, 251
See application file for complete search history.

(56) References Cited

U.S. PATENT DOCUMENTS 10,621,390 B1 *  4/2020  Winston ................ G06F 40/268
10,832,010 B2   11/2020  Luke et al.
2020/0104354 A1 *  4/2020  Anisimovich ........ G06F 40/295

* cited by examiner

*Primary Examiner* — George C Monikang
(74) *Attorney, Agent, or Firm* — HEER Law; Christopher D. Heer (57) ABSTRACT

A computer-implemented method and system for natural language computation is described. An input sentence is matched to a token. Upon determining a match with the token, the token being a trigger sentence, a semantic rule associated with the trigger sentence is executed using the input sentence. Upon determining a match with the token, the token being a metalanguage sentence, using the input sentence, a new semantic rule is stored and an association between the new semantic rule and one or more defined trigger sentences is stored. Upon determining a match with the token, the token being a built-in sentence, one or more built-in functions associated with the built-in sentence is executed using the input sentence.

16 Claims, 4 Drawing Sheets

MULTILINGUAL CONVERSATIONAL SEMANTIC PROCESSOR

FIELD

The present specification relates generally to natural language processing and more specifically to executing new computer-readable instructions defined based on natural language input.

BACKGROUND

Computer software typically requires hardcoded implementation of computer algorithms using a technical computer language that is translatable to computer-readable instructions. The computer software is unable to dynamically program or re-program its own computer instructions. Where natural language is received as input, the computer software typically can only use the input for executing existing computer instructions for which that input is defined as suitable.

SUMMARY

In accordance with an aspect, a computer-implemented method for natural language computation is provided, the method including matching an input sentence to a token; upon determining a match with the token, the token being a trigger sentence, and executing a semantic rule associated with the trigger sentence using the input sentence. Upon determining a match with the token, the token being a metalanguage sentence, using the input sentence, the method further includes storing a new semantic rule; and storing an association between the new semantic rule and one or more defined trigger sentences. The method further includes: upon determining a match with the token, the token being a built-in sentence, executing one or more built-in functions associated with the built-in sentence using the input sentence.

In some embodiments, the token is a trigger sentence, metalanguage sentence, or a built-in sentence.

In some embodiments, the matching is evaluating a match between the input sentence and one or more trigger sentences, then one or more metalanguage sentences, and then one or more built-in sentences until the match is determined.

In some embodiments, the method further includes requesting creation of a new trigger sentence, the trigger sentence matching the input sentence.

In some embodiments, the method further includes displaying a data output at a user interface, the data output representing a result corresponding to the input sentence.

In some embodiments, the built-in function is selected from the group consisting of: semantic rule, non-semantic rule, metalanguage statement or function, function call, internal operation, synchronous function, asynchronous function, single step call, multi-step call, interactive, non-interactive, remote execution function, local CPU function, database function, web call, network call, cloud call, and any type of software or hardware computer function or instruction.

In some embodiments, the metalanguage sentence represents a request to associate one or more trigger sentences with an existing trigger sentence, and the method further includes storing an association between the one or more trigger sentences and the semantic rule associated with the existing trigger sentence.

In some embodiments, the storing a new semantic rule further includes receiving one or more additional input sentences and storing the new semantic rule using the one or more additional input sentences.

In some embodiments, the semantic rule is one or more machine-readable instructions.

In some embodiments, the new semantic rule is one or more machine-readable instructions.

In some embodiments, the one or more built-in functions is one or more machine-readable instructions.

In some embodiments, the one or more machine-readable instructions is generated by recursively determining one or more nested machine-readable instructions.

In some embodiments, generating the one or more defined trigger sentences is based on the input sentence.

In some embodiments, the generating of the one or more defined trigger sentences is based on the input sentence being by, for each of the one or more defined trigger sentences, selecting a variable in the input sentence and defining the trigger sentence using the variable.

In some embodiments, executing the semantic rule is by selecting a selected metalanguage sentence from one or more defined metalanguage sentences, the one or more defined metalanguage sentences corresponding to the trigger sentence.

In accordance with an aspect, a computer-implemented method for training a natural language processor is provided, the method including: receiving a metalanguage sentence and one or more contextual inputs; receiving one or more additional input sentences, the one or more additional input sentences configurable to represent one or more machine-readable instructions; and after receiving a trigger sentence and one or more additional contextual inputs, the trigger sentence associated with the one or more machine-readable instructions, providing the trigger sentence and the one or more additional contextual inputs for execution of the one or more machine-readable instructions using the one or more additional contextual inputs.

In accordance with an aspect, a computer-implemented method for training a natural language processor is provided, the method including: receiving a metalanguage sentence and one or more contextual inputs; receiving one or more additional input sentences; storing an association between one or more machine-readable instructions and a trigger sentence, the one or more machine-readable instructions representing the one or more additional input sentences, the trigger sentence being based on the one or more contextual inputs; and executing the one or more machine-readable instructions upon receiving the trigger sentence.

In some embodiments, the method further includes generating the one or more machine-readable instructions based on the one or more additional input sentences.

In some embodiments, the one or more machine-readable instructions represents an existing semantic rule.

In some embodiments, the method further includes generating the one or more machine-readable instructions by recursively selecting one or more nested machine-readable instructions representing one or more nested additional input sentences.

In some embodiments, generating each of the one or more nested machine-readable instructions is based on one of the one or more nested additional input sentences.

In some embodiments, the one or more nested machine-readable instructions represents an existing semantic rule.

In some embodiments, storing the association is by storing an association between: the trigger sentence; and a built-in sentence or a second trigger sentence; the built-in sentence and the second trigger sentence each represented by the one or more machine-readable instructions.

In some embodiments, the method further includes: comparing the trigger sentence to a built-in sentence associated with one or more existing machine-readable instructions; and if the trigger sentence matches the built-in sentence, the storing of the association between one or more machine-readable instructions and the trigger sentence comprises replacing the association between the built-in sentence and the one or more existing machine-readable instructions.

In some embodiments, the method further includes: comparing the trigger sentence to one or more existing trigger sentences associated with one or more existing machine-readable instructions; and if the trigger sentence matches one of the one or more existing trigger sentences, the storing of the association between one or more machine-readable instructions and the trigger sentence comprises replacing the association between the one of the one or more existing trigger sentences and the one or more existing machine-readable instructions.

In accordance with an aspect, a computer-implemented method for parsing an input sentence for natural language processing is provided, the method including: receiving the input sentence; parsing the input sentence to determine one or more sentence linguistic terms; and (i) determining one or more trigger sentences corresponding to one or more of the one or more sentence linguistic terms and determining one or more contextual terms associated with the one or more sentence linguistic terms that the one or more trigger sentences correspond to; (ii) determining one or more metalanguage sentences corresponding to one or more of the one or more sentence linguistic terms and determining one or more contextual terms associated with the one or more sentence linguistic terms that the one or more metalanguage sentences correspond to; (iii) determining one or more built-in sentences corresponding to one or more of the one or more sentence linguistic terms and determining one or more contextual terms associated with the one or more of the one or more sentence linguistic terms that the one or more built-in sentences correspond to; both (i) and (ii); both (i) and (iii); both (ii) and (iii); or (i), (ii), and (iii).

In some embodiments, the one or more built-in sentences and the one or more metalanguage sentences is associated with one or more machine-readable instructions.

In some embodiments, the determining of one or more sentence linguistic terms is by using linguistic term value substitution.

In some embodiments, the method further including: parsing the input sentence to determine a metalanguage trigger sentence; if the metalanguage trigger sentence is determined, storing an association between the metalanguage trigger sentence and a metalanguage sentence determined according to (ii); if the metalanguage trigger sentence is not determined: receiving an example trigger sentence input; determining the metalanguage trigger sentence based on the example trigger sentence input; and storing an association between the metalanguage trigger sentence and a metalanguage sentence determined according to (ii).

In accordance with an aspect, there is provided a computer-implemented system for natural language computation, the system including: a non-transitory computer memory; and at least one processor in communication with the non-transitory computer memory; wherein the non-transitory computer memory comprises instructions which, when executed by the at least one processor, carries out the steps of: matching an input sentence to a token; upon determining a match with the token, the token being a trigger sentence, executing a semantic rule associated with the trigger sentence using the input sentence; upon determining a match with the token, the token being a metalanguage sentence, using the input sentence: storing a new semantic rule; and storing an association between the new semantic rule and one or more defined trigger sentences; upon determining a match with the token, the token being a built-in sentence, executing one or more built-in functions associated with the built-in sentence using the input sentence.

In some embodiments, the token is a trigger sentence, metalanguage sentence, or a built-in sentence.

In some embodiments, the matching is evaluating a match between the input sentence and one or more trigger sentences, then one or more metalanguage sentences, and then one or more built-in sentences until the match is determined.

In some embodiments, the steps further include requesting creation of a new trigger sentence, the trigger sentence matching the input sentence.

In some embodiments, the steps further include displaying a data output at a user interface, the data output representing a result corresponding to the input sentence.

In some embodiments, the built-in function is selected from the group consisting of: semantic rule, non-semantic rule, metalanguage statement or function, function call, internal operation, synchronous function, asynchronous function, single step call, multi-step call, interactive, non-interactive, remote execution function, local CPU function, database function, web call, network call, cloud call, and any type of software or hardware computer function or instruction.

In some embodiments, the metalanguage sentence represents a request to associate one or more trigger sentences with an existing trigger sentence, the method further comprising storing an association between the one or more trigger sentences and the semantic rule associated with the existing trigger sentence.

In some embodiments, the storing a new semantic rule further includes receiving one or more additional input sentences and storing the new semantic rule using the one or more additional input sentences.

In some embodiments, the semantic rule is one or more machine-readable instructions.

In some embodiments, the new semantic rule is one or more machine-readable instructions.

In some embodiments, the one or more built-in functions is one or more machine-readable instructions.

In some embodiments, the one or more machine-readable instructions is generated by recursively determining one or more nested machine-readable instructions.

In some embodiments, generating the one or more defined trigger sentences is based on the input sentence.

In some embodiments, the generating of the one or more defined trigger sentences is based on the input sentence by, for each of the one or more defined trigger sentences, selecting a variable in the input sentence and defining the trigger sentence using the variable.

In some embodiments, executing the semantic rule is by selecting a selected metalanguage sentence from one or more defined metalanguage sentences, the one or more defined metalanguage sentences corresponding to the trigger sentence.

In accordance with an aspect, a computer-implemented system for training a natural language processor is provided, the system including: a non-transitory computer memory; and at least one processor in communication with the non-transitory computer memory; wherein the non-transitory computer memory comprises instructions which, when executed by the at least one processor, carries out the steps of: receiving a metalanguage sentence and one or more contextual inputs; receiving one or more additional input sentences, the one or more additional input sentences configurable to represent one or more machine-readable instructions; and after receiving a trigger sentence and one or more additional contextual inputs, the trigger sentence associated with the one or more machine-readable instructions, providing the trigger sentence and the one or more additional contextual inputs for execution of the one or more machine-readable instructions using the one or more additional contextual inputs.

In accordance with an aspect, a computer-implemented system for training a natural language processor is provided, including: a non-transitory computer memory; and at least one processor in communication with the non-transitory computer memory; wherein the non-transitory computer memory comprises instructions which, when executed by the at least one processor, carries out the steps of: receiving a metalanguage sentence and one or more contextual inputs; receiving one or more additional input sentences; storing an association between one or more machine-readable instructions and a trigger sentence, the one or more machine-readable instructions representing the one or more additional input sentences, the trigger sentence being based on the one or more contextual inputs; and executing the one or more machine-readable instructions upon receiving the trigger sentence.

In some embodiments, the steps further include generating the one or more machine-readable instructions based on the one or more additional input sentences.

In some embodiments, the one or more machine-readable instructions represent an existing semantic rule.

In some embodiments, the steps further include generating the one or more machine-readable instructions by recursively selecting one or more nested machine-readable instructions representing one or more nested additional input sentences.

In some embodiments, generating each of the one or more nested machine-readable instructions is based on one of the one or more nested additional input sentences.

In some embodiments, the one or more nested machine-readable instructions represents an existing semantic rule.

In some embodiments, storing the association is by storing an association between: the trigger sentence; and a built-in sentence or a second trigger sentence; the built-in sentence and the second trigger sentence each represented by the one or more machine-readable instructions.

In some embodiments, the steps further include: comparing the trigger sentence to a built-in sentence associated with one or more existing machine-readable instructions; and if the trigger sentence matches the built-in sentence, the storing of the association between one or more machine-readable instructions and the trigger sentence comprises replacing the association between the built-in sentence and the one or more existing machine-readable instructions.

In some embodiments, the steps further include: comparing the trigger sentence to one or more existing trigger sentences associated with one or more existing machine-readable instructions; and if the trigger sentence matches one of the one or more existing trigger sentences, the storing of the association between one or more machine-readable instructions and the trigger sentence comprises replacing the association between the one of the one or more existing trigger sentences and the one or more existing machine-readable instructions.

In accordance with an aspect, a computer-implemented system for parsing an input sentence for natural language processing is provided, the system including: a non-transitory computer memory; and at least one processor in communication with the non-transitory computer memory; wherein the non-transitory computer memory comprises instructions which, when executed by the at least one processor, carries out the steps of: receiving the input sentence; parsing the input sentence to determine one or more sentence linguistic terms; and (i) determining one or more trigger sentences corresponding to one or more of the one or more sentence linguistic terms and determining one or more contextual terms associated with the one or more sentence linguistic terms that the one or more trigger sentences correspond to; (ii) determining one or more metalanguage sentences corresponding to one or more of the one or more sentence linguistic terms and determining one or more contextual terms associated with the one or more sentence linguistic terms that the one or more metalanguage sentences correspond to; (iii) determining one or more built-in sentences corresponding to one or more of the one or more sentence linguistic terms and determining one or more contextual terms associated with the one or more of the one or more sentence linguistic terms that the one or more built-in sentences correspond to; both (i) and (ii); both (i) and (iii); both (ii) and (iii); or (i), (ii), and (iii).

In some embodiments, the one or more built-in sentences and the one or more metalanguage sentences are associated with one or more machine-readable instructions.

In some embodiments, the determining of one or more sentence linguistic terms is by using linguistic term value substitution.

In some embodiments, the steps further include: parsing the input sentence to determine a metalanguage trigger sentence; if the metalanguage trigger sentence is determined, storing an association between the metalanguage trigger sentence and a metalanguage sentence determined according to (ii); if the metalanguage trigger sentence is not determined: receiving an example trigger sentence input; determining the metalanguage trigger sentence based on the example trigger sentence input; and storing an association between the metalanguage trigger sentence and a metalanguage sentence determined according to (ii).

In accordance with an aspect, a non-transitory computer-readable medium is provided containing computer-readable instructions which, when executed by a computer processor, perform a method of: matching an input sentence to a token; upon determining a match with the token, the token being a trigger sentence, executing a semantic rule associated with the trigger sentence using the input sentence; upon determining a match with the token, the token being a metalanguage sentence, using the input sentence: storing a new semantic rule; and storing an association between the new semantic rule and one or more defined trigger sentences; upon determining a match with the token, the token being a built-in sentence, executing one or more built-in functions associated with the built-in sentence using the input sentence.

In accordance with an aspect, a non-transitory computer-readable medium is provided containing computer-readable instructions which, when executed by a computer processor, perform a method of: receiving a metalanguage sentence and one or more contextual inputs; receiving one or more additional input sentences; storing an association between one or more machine-readable instructions and a trigger sentence, the one or more machine-readable instructions representing the one or more additional input sentences, the trigger sentence being based on the one or more contextual inputs; and executing the one or more machine-readable instructions upon receiving the trigger sentence.

In accordance with an aspect, a non-transitory computer-readable medium is provided containing computer-readable instructions which, when executed by a computer processor, perform a method of: receiving the input sentence; parsing the input sentence to determine one or more sentence linguistic terms; and (i) determining one or more trigger sentences corresponding to one or more of the one or more sentence linguistic terms and determining one or more contextual terms associated with the one or more sentence linguistic terms that the one or more trigger sentences correspond to; (ii) determining one or more metalanguage sentences corresponding to one or more of the one or more sentence linguistic terms and determining one or more contextual terms associated with the one or more sentence linguistic terms that the one or more metalanguage sentences correspond to; (iii) determining one or more built-in sentences corresponding to one or more of the one or more sentence linguistic terms and determining one or more contextual terms associated with the one or more of the one or more sentence linguistic terms that the one or more built-in sentences correspond to; both (i) and (ii); both (i) and (iii); both (ii) and (iii); or (i), (ii), and (iii).

Other aspects and features according to the present application will become apparent to those ordinarily skilled in the art upon review of the following description of embodiments in conjunction with the accompanying figures.

BRIEF DESCRIPTION OF THE FIGURES

The principles of embodiments may better be understood with reference to the accompanying figures provided by way of illustration of an exemplary embodiment, or embodiments, incorporating principles and aspects, and in which.

DETAILED DESCRIPTION

The description that follows, and the embodiments described therein, are provided by way of illustration of an example, or examples, of particular embodiments. These examples are provided for the purposes of explanation, and not of limitation, of those principles. In the description, like parts are marked throughout the specification and the drawings with the same respective reference numerals. The drawings are not necessarily to scale and in some instances proportions may have been exaggerated in order to more clearly to depict certain features.

Figure 1:
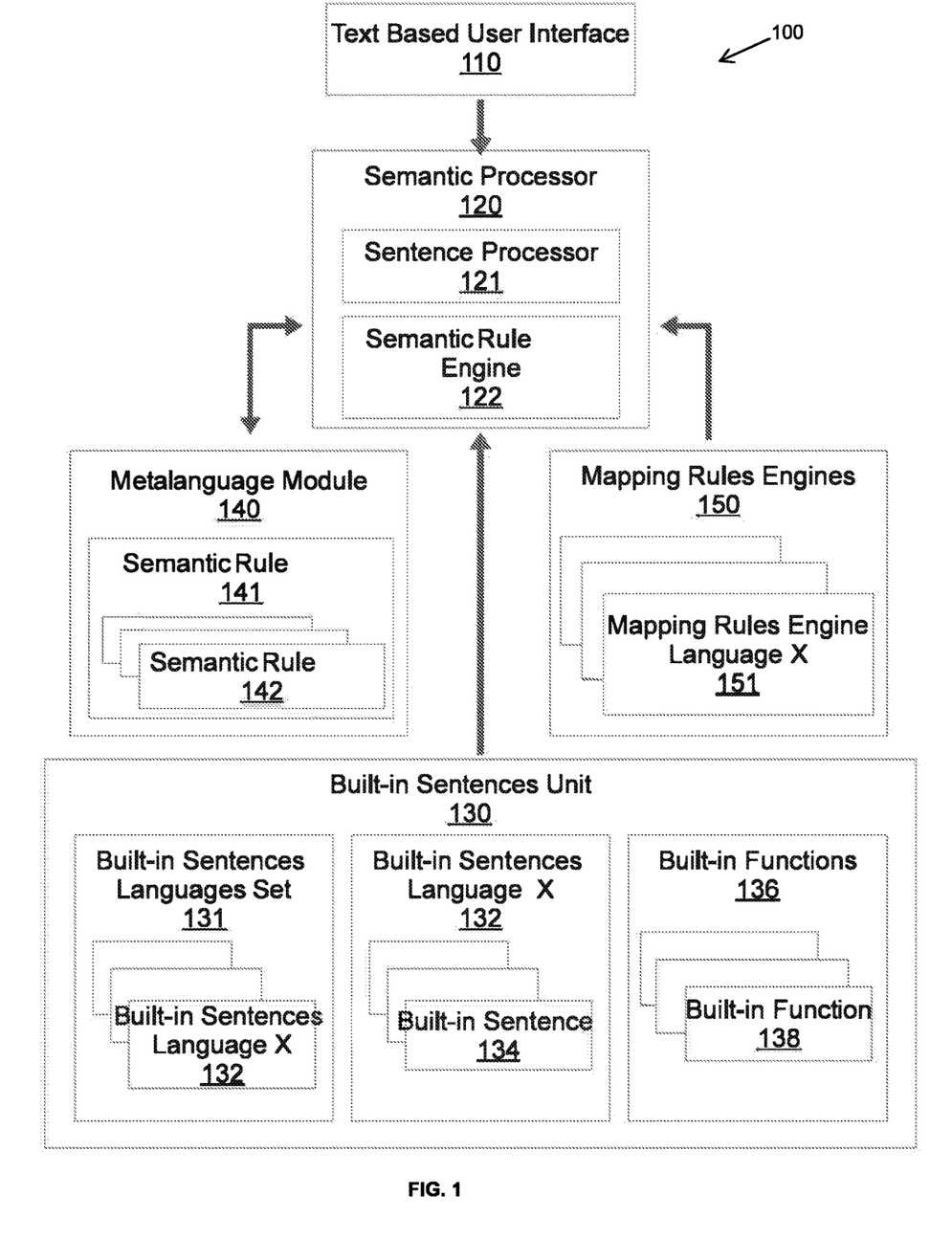
FIG. 1 is a schematic diagram of a semantic processing system, according to some embodiments.

FIG. 1 is a schematic diagram of an example semantic processing system 100, according to some embodiments. The semantic processing system 100 can be a multilingual conversational semantic processor, for example. The semantic processing system 100 includes user interface 110 (e.g., text-based), semantic processing unit 120, metalanguage unit 140, mapping rules engines 150, and built-in sentences unit 130. Semantic processing unit 120 includes sentence processor 121 and semantic rule processor 122. Metalanguage unit 140 includes one or more semantic rules 141, 142. Mapping rules engine 150 includes a mapping rules engine 151 for each language of one or more languages. Built-in sentences unit 130 includes one or more built-in sentences languages sets 131, each of which include one or more built-in sentences for one or more languages 132, each of which includes one or more built-in sentences 134. Built-in sentences unit 130 also includes one or more built-in functions 136, 138.

User interface 110 can receive natural language input from a user and transmit an output back to the user. Semantic processing system 100 is configured to display a data output at user interface 110, the data output representing a result corresponding to an input sentence, according to some embodiments. The data output can instead or in addition represent a request for additional input, such as input that can be used to define steps in a new semantic rule.

Built-in sentences unit 130 is configured to store and/or process one or more sets of natural language sentences or sentence templates that are pre-mapped to already existing built-in functions. These sentences may themselves be semantic rules or may be simpler basic sentences. The built-in functions may be any combination of: semantic rule, non-semantic rule, metalanguage statement or function, function call, internal operation, synchronous function, asynchronous function, single step call, multi-step call, interactive, non-interactive, remote execution function, local CPU function, database function, web/network/cloud call or any other type of software or hardware computer function or instruction. Any one built-in function may be pre-mapped from more than one sentence or sentence template. Additionally, any one built-in function may have sentences mapped to it in more than one language.

Metalanguage unit 140 is configured to store and/or process metalanguage sentences or sentence templates. Using built-in metalanguage sentences or sentence templates, metalanguage unit 140 is configured to create and store user specified natural language semantic rules. Example metalanguage sentences may include (but are not limited to):

A) "here is how to <do something>"

e.g., "here is how to calculate the square root of a number"

In this example, <do something> can represent a variable received with the respective metalanguage sentence. The variable can be used to execute, define, or generate other sentences or semantic rules or built-in functions, for example.

Each semantic rule will have one or more associated trigger sentences or sentence templates and such association can be stored by semantic processing unit 120. For example, the trigger sentence for example A) above may be "calculate the square root of <number>". Upon receiving one of these as input sentences, metalanguage unit 140 is configured to store the corresponding associations such as among the indicated trigger sentences and the corresponding semantic rule(s). the associations can be used to execute the corresponding semantic rule(s) upon receiving one of the trigger sentences.

Each semantic rule can be processed as a sequential series of one or more sentences where each sentence is either a built-in sentence or a trigger sentence.

As used herein, an input sentence includes a portion of an input sentence (e.g., a variable) and/or a token generated from the input sentence or portion thereof An input sentence can match a trigger sentence, metalanguage sentence, or built-in sentence if one or more portions of the input sentence correspond to same. The input sentence can include other portions such as variables (e.g., contextual inputs, linguistic terms) that can be used during later execution or processing.

Semantic processing unit 120 is configured to store and/or process one or more sentences and/or one or more semantic rules. The semantic processing unit 120 contains both a sentence processor 121 and a semantic rule processor 122. The semantic processing unit 120 can both execute a sentence or semantic rule as well as test or validate that a sentence can be used as part of a semantic rule. A sentence that can match either an existing trigger sentence or built-in sentence can be considered to be a valid sentence within a semantic rule.

Sentence processor 121 is configured to execute or validate a single sentence. Sentence processor 121 is configured to perform linguistic term value substitution and related functions. Sentence processor 121 can use one or more rules defined by mapping rules engine 150 to perform linguistic term value substitution. Execution of a single sentence might be a multi-step process and can involve interaction with the user. For example, sentence processing unit 120 can be configured to transmit a request to the user for additional input sentences to confirm or validate an input or intention. Sentence processor 121 may validate a single sentence by recursively validating sentences nested within same. Sentence processor 121 may clean a sentence and select tokens from a sentence for further processing, for example.

Semantic rule processor 122 is configured to validate and execute one or more sentences comprising a semantic rule. Due to the nature of language, the execution processing may nest (recursively) several levels deep for any one specific semantic rule.

Rules mapping engine 150 is configured to store, process, and/or execute or implement one or more mapping rules. In some embodiments, there is one mapping rules engine 150 per language supported by semantic processing system 100. There can be no limit on how many languages semantic processing system 100 can support.

Mapping rules engine 150 can be accessed by semantic processing unit 120, such as to process, clean, select, and/or determine portions of an input, such as an input sentence or variable. The portion of the input can be transmitted or used for further processing. For example, a portion of the input that is determined to be an input sentence that matches a token such as a trigger sentence stored by semantic processing system 100 can be passed with another portion of the input that is determined to be a variable for execution of a semantic rule associated in semantic processing system 100 with the trigger sentence. The portions of the input also can be variously referred to as sentence linguistic terms, linguistic terms, or values. In some embodiments, any other component described herein that uses mapping rules engine 150, such as during the creation of a semantic rule, does so via semantic processing unit 120.

Each metalanguage sentence type or built-in sentence may have one or more associated language specific mapping rules for linguistic terms contained therein. Mapping rules engine 150 is configured to store, process, and/or execute same, according to some embodiments. Mapping rules engine 150 can be configured to implement and execute rules for configuring semantic processing system 100 and/or processing inputs received.

For built-in sentences, the rules can determine how to pass sentence linguistic terms or values from an input trigger sentence to an associated built-in function already programmed into semantic processing system 100.

For metalanguage sentence types, the rules can determine how to pass the sentence linguistic terms from an input trigger sentence to a sentence contained in the associated semantic rule. This can allow a user-defined input to be used by semantic processing system 100 to define a semantic rule, where portions of an input can be used to match or determine a corresponding semantic rule for which user input can define the steps to be performed upon its execution by semantic processing system 100. For example, an input sentence can define a step in a new semantic rule, and mapping rules engine 150 is configured to associate the input sentence with a proper existing semantic rule, such that upon execution of the new semantic rule, at the execution of the step, the proper existing semantic rule is executed.

Associations or correspondences described herein can be stored by semantic processing system 100 in a database or in memory and can be created by metalanguage unit 140, for example.

In some embodiments, semantic processing system 100 is configured to execute instructions in memory to implement a method for natural language computation. Semantic processing system 100 is configured to match an input sentence (e.g., received from user interface 110) to a token. Semantic processing system 100 may be configured to contain a plurality of matching rules. For example, semantic processing system 100 may be configured to perform matching using a search rule and comparison rule that allows the input sentence to be compared to each of one or more tokens stored in a database or in memory. Tokens can be a trigger sentence, a metalanguage sentence, or a built-in sentence, for example. If semantic processing system 100 determines a match between the input sentence and a token, where the token is a trigger sentence, semantic processing unit 120 is configured to execute one or more semantic rules associated with the trigger sentence using the input sentence. For example, sentence processor 121 is configured to receive, process, and/or validate an input sentence, such as by parsing the input sentence, removing or adding portions of the input sentence (e.g., removing white space), and determining one or more parts of the input sentence that correspond to one or more trigger sentences, input corresponding to a trigger sentence.

The input sentence can be used to execute one or more semantic rules including by parsing, selecting, and/or extracting one or more portions of the input sentence representing a variable, such as a condition, attribute, or field. The variable can be used with the matched trigger sentence to perform a function associated with the trigger sentence, such as executing a corresponding semantic rule based on the variable.

If semantic processing system 100 determines a match between the input sentence and a token, where the token is a metalanguage sentence, metalanguage unit 140 is configured to, using the input sentence, store a new semantic rule and store an association between the new semantic rule and one or more defined trigger sentences. The input sentence can be used including by parsing, selecting, and/or extracting one or more portions representing a variable, such as a condition, attribute, or field. The variable can be used with the matched metalanguage sentence to perform a function associated with the metalanguage sentence, such as storing a new semantic rule for a trigger sentence defined or generated using the variable.

The new semantic rule can be generated and/or stored based on the input sentence and/or one or more additional inputs that can be used to define one or more steps in the new semantic rule, for example. The new semantic rule can be associated with the one or more defined trigger sentences such that upon receiving an input that matches the one or more defined trigger sentences, the new semantic rule is executed by semantic rule processor 122. The semantic processing system 100 can request via user interface 110 for additional input to be used to define one or more defined trigger sentences, can generate one or more defined trigger sentences from the original input sentence, and/or can generate an association with one or more defined trigger sentences already stored by semantic processing system 100. For example, upon matching an input sentence with a metalanguage sentence representing or requesting that a new semantic rule is to be defined, metalanguage unit 140 is configured to store a new semantic rule based on the input sentence and/or one or more additional user inputs, as well as an association between the new semantic rule and each of one or more trigger sentences.

Metalanguage unit 140 can receive one or more additional input sentences and store the new semantic rule using the one or more additional input sentences. For example, metalanguage unit 140 can request additional user inputs via user interface 110 and receive one or more additional input sentences. Each of the one or more additional input sentences can be or can be used to generate a trigger sentence for a semantic rule, for example. Each of the one or more additional input sentences can be or can be used to generate a built-in sentence, for example. Each of the one or more additional input sentences can be or can be used to generate a metalanguage sentence, for example. The additional input sentences and/or any tokens generated based on same can be stored and later retrieved, such as to execute the new semantic rule. The new semantic rule can be defined by the one or more additional input sentences and the new semantic rule (e.g., the additional input sentences) can be executed or processed for execution following receiving the trigger sentence associated with same, for example.

The trigger sentence(s) can be generated based on the input sentence, can be generated based on additional input, can be trigger sentences stored in semantic processing system 100, or a combination of same.

If semantic processing system 100 determines a match between the input sentence and a token, where the token is a built-in sentence, built-in sentences unit 130 is configured to execute one or more built-in functions associated with the built-in sentence using the input sentence.

The input sentence can be used including by parsing, selecting, and/or extracting one or more portions representing a variable, such as an attribute or field. The variable can be used with the matched built-in sentence to perform a function associated with the built-in sentence, such as executing a built-in function with the variable or selecting a built-in function based on the variable.

Each built-in sentence can be a semantic rule or can be a simpler basic sentence, for example. The one or more built-in functions can be one or more machine-readable instructions. The built-in functions may be any combination of: semantic rule, non-semantic rule, metalanguage statement or function, function call, internal operation, synchronous function, asynchronous function, single step call, multi-step call, interactive, non-interactive, remote execution function, local CPU function, database function, web/network/cloud call or any other type of software or hardware computer function or instruction. A particular built-in function can be executed after determining a match with one or more different input sentences.

In some embodiments, semantic processing system 100 is configured to match an input sentence to a token by evaluating a match between the input sentence and one or more trigger sentences, then one or more metalanguage sentences, and then one or more built-in sentences until the match is determined. Such matching can be performed in this order with further evaluation of a match not performed after a match is determined. For example, if the input sentence matches a metalanguage sentence, the input sentence is not further evaluated for matching with one or more built-in sentences, unless such is performed according to a method triggered by or following determining a match with the metalanguage sentence (e.g., matching of a further input received for defining a step in a new semantic rule following receiving an input sentence that matches a metalanguage sentence for creating the new semantic rule; processing of nested sentences).

In some embodiments, semantic processing system 100 is configured to receive a request for creation of a new trigger sentence, where the trigger sentence matches the input sentence. Metalanguage unit 140 and/or semantic processing unit 120 is configured to generate and store an association between the new trigger sentence and one or more semantic rules, whether defined based on further input received or already stored in semantic processing system 100. Semantic processing system 100 can configure a request to be sent for the further input via user interface 110. The new trigger sentence can be generated by processing and/or parsing the input sentence (such as to remove typographical errors).

As referred to herein, a semantic rule, new semantic rule, or built-in function can be one or more machine-readable instructions. The one or more machine-readable instructions can be a set of machine-readable instructions. The one or more machine-readable instructions can be generated by semantic processing unit 120, metalanguage unit 140, built-in sentences unit 130, or mapping rules engine 150 by recursively determining one or more nested machine-readable instructions. For example, an input sentence can contain more than one token, such as a trigger sentence as well as a built-in sentence, and each of the tokens can be selected and/or processed, as well as used for storing, creating an association with, or executing one or more corresponding machine-readable instructions. As another example, an input sentence received to define a new semantic rule following receiving a metalanguage sentence may be itself a metalanguage sentence or itself a trigger sentence for a separate semantic rule and so on. Processing of a single sentence can involve processing of one or more subsequent sentences (e.g., nested sentences). Semantic processing system 100 is configured to process each of these sentences such as according to a process described herein in relation to a sentence of that type. Semantic processing system 100 is configured to allow for storage and/or execution of a set of machine-readable instructions generated for or associated with the sentence, including any and all of any subsequent sentences (e.g., nested sentences). This can be performed recursively. For example, a method described herein can be performed recursively on its output or can be performed as part of its method.

The one or more defined trigger sentences can be generated based on the input sentence. As an example, generating the one or more defined trigger sentences based on the input sentence can be by, for each of the one or more defined trigger sentences, selecting a variable in the input sentence and defining the trigger sentence using the variable. For example, a defined trigger sentence can be a trailing portion of an input sentence that begins with a portion that matches a metalanguage sentence. The trailing portion can be parsed by sentence processor 121 and defined as the variable.

As an alternative, the one or more defined trigger sentences can be selected from an existing database of trigger sentences. The one or more defined trigger sentences can be associated with the newly defined semantic rule.

In some embodiments, semantic processing system 100 implements a computer-implemented method for training a natural language processor that includes receiving a metalanguage sentence and one or more contextual inputs; receiving one or more additional input sentences, the one or more additional input sentences configurable to represent one or more machine-readable instructions; and after receiving a trigger sentence and one or more additional contextual inputs, the trigger sentence associated with the one or more machine-readable instructions, providing the trigger sentence and the one or more additional contextual inputs for execution of the one or more machine-readable instructions using the one or more additional contextual inputs. This can be implemented at a computer application, such as a chatbot.

In some embodiments, semantic processing system 100 implements a computer-implemented method for training a natural language processor that includes receiving a metalanguage sentence and one or more contextual inputs; receiving one or more additional input sentences; storing an association between one or more machine-readable instructions and a trigger sentence, the one or more machine-readable instructions representing the one or more additional input sentences, the trigger sentence being based on the one or more contextual inputs; and executing the one or more machine-readable instructions upon receiving the trigger sentence. For example, a computer application such as a chatbot can receive the metalanguage sentence and one or more contextual inputs, as well as one or more additional input sentences and provide same to a remote computer, which can store the association between the one or more machine-readable instructions and the trigger sentence, as well as perform the execution described. As used herein, a contextual input can refer to a variable, and a variable can refer to a contextual input.

Semantic processing system 100, such as at metalanguage unit 140 and/or semantic processing unit 120, can generate the one or more machine-readable instructions based on the one or more additional input sentences. This can be implemented by performing linguistic term substitution at mapping rules engine 150 using one or more variables or contextual inputs associated with or included in the additional input sentences, and maintaining associations with one or more semantic rules, such as implemented by built-in functions at the lowest level.

For example, mapping rules engine 150 can perform linguistic term substitution on a sentence (e.g., input sentence, metalanguage sentence, trigger sentence, semantic rule statement or sentence) to generate a new sentence having the substituted linguistic terms, the substituted linguistic terms being identical to or derived from one or more variables (e.g., contextual inputs) associated with or included as part of the sentence. The newly generated sentence can be used for subsequent processing as a sentence according to an embodiment described herein for a sentence. For example, the newly generated sentence can be a trigger sentence that is used to select an associated semantic rule, and the semantic rule can be then executed by semantic rule engine 122 using the trigger sentence having the substituted terms.

One or more machine-readable instructions can represent an existing semantic rule, such as stored by semantic processing system 100 in a database or accessible by same via a remote computer over a network.

Semantic processing unit 120 and/or metalanguage unit 140 can process a sentence by recursively performing a method for processing a sentence described herein. For example, a sentence or a semantic rule can require nested execution and/or nested evaluation of subsequent sentences. Semantic processing unit 120 is configured to generate one or more machine-readable instructions by recursively selecting one or more nested machine-readable instructions representing one or more nested additional input sentences, according to some embodiments. The machine-readable instructions can be stored or executed on execution of the corresponding nested additional input sentence. Generating each of the one or more nested machine-readable instructions can be based on one of the one or more nested additional input sentences. The one or more nested machine-readable instructions can represent an existing semantic rule. The one or more nested machine-readable instructions can be executed in order to execute the existing semantic rule.

In some embodiments, semantic processing system 100 is configured to compare the trigger sentence to one or more existing trigger sentences associated with one or more existing machine-readable instructions; and if the trigger sentence matches one of the one or more existing trigger sentences, the storing of the association between one or more machine-readable instructions and the trigger sentence comprises replacing the association between the one of the one or more existing trigger sentences and the one or more existing machine-readable instructions. This can enable a trigger sentence to replace an existing trigger sentence associated with an existing semantic rule, for example. the semantic rule can be executed upon receiving the trigger sentence that replaced the existing trigger sentence, but not upon receiving the existing trigger sentence that was replaced. Corresponding metalanguage sentence(s) can be received requesting that this be done.

In some embodiments, semantic processing system 100 is configured to implement a method for parsing an input sentence for natural language processing by receiving the input sentence and parsing the input sentence to determine one or more sentence linguistic terms.

Next, semantic processing system 100 can determine whether one or more trigger sentences correspond to one or more of the one or more sentence linguistic terms and determine one or more contextual terms associated with the one or more sentence linguistic terms that the one or more trigger sentences correspond to. The sentence linguistic terms and the contextual terms can each comprise one or more portions of the input sentence or also include other tokens such as added to the sentence during processing.

If no, the sentence linguistic terms can be evaluated by semantic processing unit 120 and same can determine whether one or more metalanguage sentences stored by or accessible by the semantic processing system 100 corresponds to one or more of the one or more sentence linguistic terms. Semantic processing unit 120 such as at sentence processor 121 can determine one or more contextual terms associated with the one or more sentence linguistic terms that the one or more metalanguage sentences correspond to. This can be by parsing the input sentence and selecting one or more portions determined to be a contextual term.

If no, semantic processing unit 120 can determine whether one or more built-in sentences correspond to one or more of the one or more sentence linguistic terms and determine one or more contextual terms associated with the one or more of the one or more sentence linguistic terms that the one or more built-in sentences correspond to.

Semantic processing unit 120 can also do one or more of any combination of the foregoing steps. The terms so determined can be used during further processing (e.g., semantic term substitution or language translation) or execution, such as of a semantic rule, metalanguage sentence, or built-in function. The one or more built-in sentences and the one or more metalanguage sentences can each be associated with one or more machine-readable instructions.

In some embodiments, semantic processing unit 120 is configured to parse the input sentence to determine a metalanguage trigger sentence. If the metalanguage trigger sentence is determined, an association between the metalanguage trigger sentence and a metalanguage sentence determined according a method described herein is stored. If the metalanguage trigger sentence is not determined, semantic processing unit 120 is configured to receive an example trigger sentence input (e.g., upon requesting same via a user input 110); determine the metalanguage trigger sentence based on the example trigger sentence input; and store an association between the metalanguage trigger sentence and a metalanguage sentence determined according to a method described herein.

Figure 2:
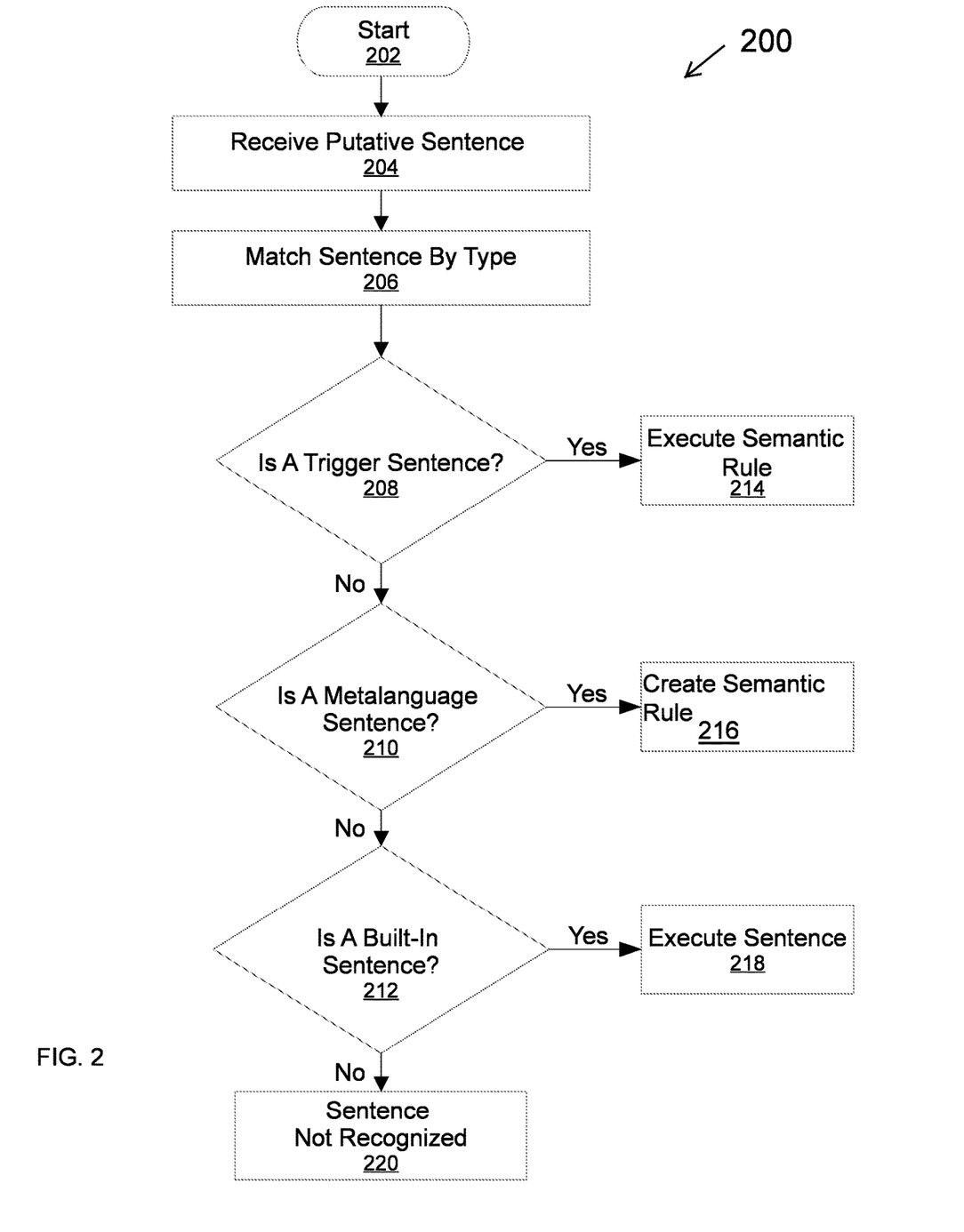
FIG. 2 is a flow diagram of a method for processing a sentence, according to some embodiments.

FIG. 2 is a flow diagram of an example method 200 for processing a sentence by an example semantic processing system 100, according to some embodiments. At 202, the method begins. At 204, semantic processing system 100 receives an input sentence, for example, at user interface 110. At 206, semantic processing system 100 parses the input sentence and matches the input sentence by type. At 208, semantic processing system 100 evaluates whether the input sentence is a trigger sentence. If yes, at 214, semantic processing unit 120 executes a semantic rule corresponding to the trigger sentence. If no, at 210, semantic processing system 100 evaluates whether the input sentence is a metalanguage sentence. If yes, at 216, metalanguage unit 140 creates one or more semantic rules based on the metalanguage sentence. If no, at 212, semantic processing system 100 evaluates whether the input sentence is a built-in sentence. If yes, at 218, built-in sentences unit 130 executes one or more built-in functions based on the built-in sentence. If no, at 220, semantic processing system 100 can return a notification to the user interface 110 that the sentence is not recognized and/or a request that an additional input be provided.

According to some embodiments, semantic processing system 100 implements a process as follows for processing a sentence. Semantic processing system 100 is initialized with a set of pre-programmed operations such as the ability to search for a topic on an Internet page (e.g., Wikipedia page) or the ability to add two numbers together. These can be implemented as built-in functions. Semantic processing system 100 is initiated and various components are loaded and initiated, such as the loading of pre-programmed built-in sentences, their corresponding pre-built functions, and any associated language rules and other artifacts. Associations that can be used to execute same are stored in semantic processing system 100. The other artifacts can include stored semantic rules and their associated trigger sentences and rules (e.g., as generated or stored by mapping rules engine 150). These may have been generated by semantic processing system 100 during a previous run or use of semantic processing system 100 or may be loaded from a database or remote server. Once system initialization and loading is complete, semantic processing system 100 can output to a user interface 110 a welcome or startup message indicating that semantic processing system 100 is ready to receive natural language input such as from a user. Control is then passed to semantic processing unit 120. Natural language input in the form of input sentences (e.g., text) may include directives, questions, statements, or answers to questions presented by the semantic processing system 100. As described herein, an input sentence can be text, audio, graphic, or other input normally construed as representing an utterance or natural language. Semantic processing unit 120 is configured to translate (e.g., using mapping rules engine 150) the input sentence to text or other proper format usable by semantic processing system 100 as described herein.

When an input sentence is received, the input sentence can be presented on user interface 110, and semantic processing system 100 is configured to process the input sentence using sentence processing unit 120. Sentence processing unit 120 is configured to determine a match between the input sentence and a known (e.g., stored or retrieved) sentence according to type. Mapping rules engine 150 can be used by sentence processing unit 120 for conducting the matching processing. Mapping rules engine 150 can implement and use language mapping rules, for example. An input sentence can be matched (or determined for matching) to either a semantic rule trigger sentence, a predefined metalanguage sentence, or a pre-defined built-in sentence in that order, according to some embodiments.

If no matches are found for the input sentence, then semantic processing system 100 may generate and present an error message at user interface 110 and allow a user to rephrase the input or take other corrective measures, such as creating a semantic rule with a trigger sentence that matches the rejected input sentence. Semantic processing system 100 is configured to generate the semantic rule having the trigger sentence that matches the rejected input sentence upon receiving appropriate input from the user, such as an original input sentence including a metalanguage sentence requesting the creation (e.g., "Here is how to find my current location."), one or more further input sentences that are suitable for defining one or more steps in the semantic rule, and, optionally, an input sentence suitable for defining the trigger sentence for the semantic rule. Alternatively, semantic processing system 100 can determine an appropriate trigger sentence from the original input sentence that included the metalanguage sentence, such as based on one or more variables included in the original input sentence. For example, "find my current location" can be the trigger sentence determined appropriate by semantic processing system 100 from the original input sentence, "here is how to find my current location".

If an input sentence is recognized as a semantic rule trigger sentence, then semantic processing system 100 is configured to call the semantic rule engine 122 to select and then execute an associated semantic rule.

If the input sentence is matched to a metalanguage sentence (e.g., is an instance of a metalanguage sentence), then semantic processing system 100 is configured to transfer control to metalanguage unit 140, and metalanguage unit 140 is configured to receive further natural language user input to create a new semantic rule, in some embodiments.

If an input sentence is matched to a built-in sentence, then the input sentence is compared with the matching sentence and any linguistic terms (e.g., variables or other portions of the input sentence) it contains are translated to the context of the matching sentence using mapping rules engine 150. Then, the input sentence is executed by looking up the matching sentence's corresponding internal operation using any requisite linguistic terms present in the input sentence.

The internal operation can include one or more built-in functions or semantic rules, for example.

Once processing has been complete for a received input sentence, semantic processing system 100 is configured to loop back and wait for another natural language input from the user.

Figure 3:
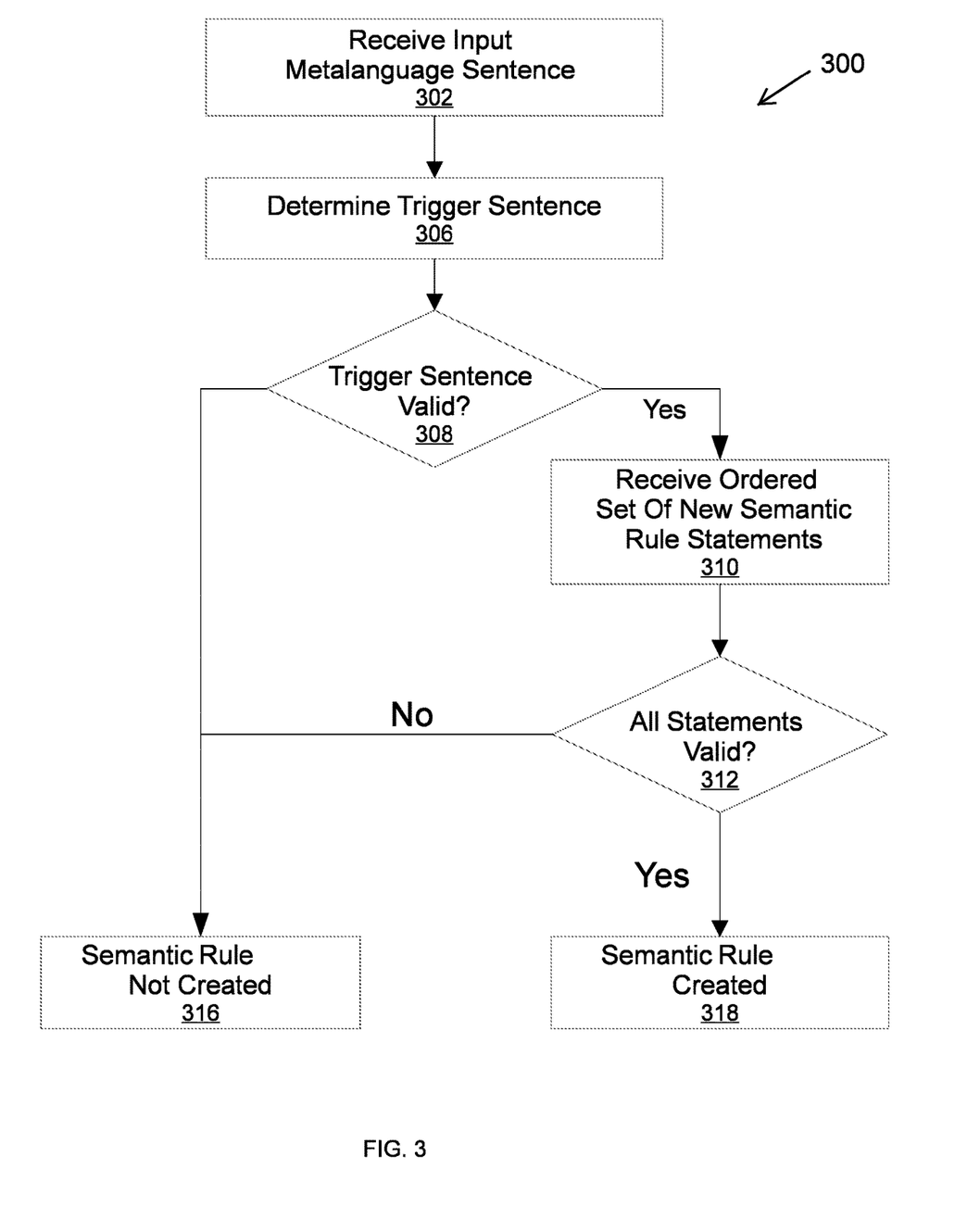
FIG. 3 is a flow diagram of a method for creating a semantic rule, according to some embodiments.

FIG. 3 is a flow diagram of an example method 300 for creating a semantic rule using an example semantic processing system 100, according to some embodiments. At 302, an input sentence is received. Sentence processing unit 120 is configured to match the input sentence. In the example shown, sentence processing unit 120 matches the input sentence to a metalanguage sentence stored in semantic processing system 100. At 306, sentence processing unit 120 parses the input sentence and selects and determines or generates a trigger sentence based on the input sentence or a portion thereof. At 308, sentence processing unit 120 determines whether the trigger sentence is valid, such as according to rules stored by mapping rules engine 150. A trigger sentence may be considered valid by the semantic processing system 100 if the resulting constructed sentence is valid according to the mapping rules, if any, used in conjunction with the metalanguage statement. If linguistic terms are present, this can mean that each metalanguage linguistic term is either the exact same value or is the superset class of the corresponding linguistic term contained in the trigger sentence.

If no, at 316, a semantic rule is not created, and semantic processing system 100 may present a notification of same at user interface 110.

If yes, at 310, semantic processing unit 120 is configured to receive an ordered set of semantic rule statements. This may be facilitated by prompts for same presented at user interface 110. At 312, if all statements are valid, the process proceeds to 318, but if not, the process proceeds to 316.

In some embodiments, instead of the process at 310, if the trigger sentence determined at 306 corresponds to an existing trigger sentence accessible (e.g., in a database or via a remote server) by semantic processing system 100, the processes proceeds to 318, where a semantic rule is created, and the steps in the semantic rule being the semantic rule associated with the trigger sentence determined at 306.

According to some embodiments, semantic processing system 100 implements a process as follows for creating a semantic rule. Metalanguage unit 140 is configured to create and control the process to create semantic rules. Metalanguage unit 140 can be called from sentence processor 121 after sentence processor 121 has matched an input sentence. For example, a user can provide an input containing or consisting of an input sentence. Sentence processor 121 is configured to process the input such as to clean the input and/or select one or more portions of the input. Sentence processor 121 is configured to determine a match between the one or more portions of the input and a trigger sentence, metalanguage sentence, or built-in sentence. For example, sentence processor 121 can evaluate multiple portions used together or a single portion of the input to determine whether same matches any one of one or more trigger sentences, followed by any one of one or more metalanguage sentences, followed by any one of one or more built-in sentences. This can be evaluated in that order. If sentences processor 121 determines that a portion or portions used together of the input is an input sentence that matches a metalanguage sentence stored in semantic processing system 100, metalanguage unit 140 can be configured to generate a semantic rule and/or store a new association with an existing stored semantic rule based on the input sentence.

The input sentence can also include one or more portions that can be determined by sentences processor 121 to individually or in combination match other tokens or are variables that can be used for execution of a sentence. Sentences processor 121 is configured to allow one or more semantic rules, built-in functions, or other processes to be executed based on the input sentence (e.g., a portion of the input sentence that matches a token together with another portion of the input sentence that is a variable). Sentences processor 121 is configured to call mapping rules engine 150, and mapping rules engine 150 is configured to determine what portions of the input sentence correspond to what e.g., match tokens, are variables, etc. based on one or more rules, such as stored in a paired semantic linguistic terms list.

A semantic rule can include the following components: a defining metalanguage statement, a trigger sentence, and a set of ordered valid natural language sentences. Sentence processor 121 can be configured to determine or select one or more of these components from a user input and/or generate same based on the user input. Same can then be provided to, for example, metalanguage unit 140 for further processing.

As an example, semantic processing system 100 can be configured to connect with a user interface 110 (e.g., text-based, audio-based, graphic-based, etc.) and exchange a series of outputs and inputs, such as illustrated in the following Table 1 together with denotations illustrating interleaved example processes performed by semantic processing system 100.

TABLE 1

Example Partial Conversation Defining
and Then Triggering A Semantic rule.

User: here is how to confirm a reservation number
System: Ok, please type your sentences in, one per line followed by "that's it" or "done"
User: print the reservation number
User: email the reservation number
User: that's it
System: Okay, 'confirm a reservation number' now means the following:
print the reservation number
email the reservation number
User:...
System: <at some point, creates reservation ABC123 for user> User:...
User: confirm reservation ABC123
System: <system executes the following sentences>: 'print the reservation ABC123'
'email the reservation ABC123'
System: okay A trigger sentence for a semantic rule can be determined from the input sentence used to define the semantic rule (e.g., the input that was the impetus for the metalanguage unit 140 to be called). For example, if the input sentence was "here is how to calculate the square root of a number", then the corresponding trigger sentence can be determined and stored by metalanguage unit 140 as "calculate the square root of <number>".

Mapping rules engine 150 is configured to implement this process. Mapping rules engine 150 is configured to apply language specific rules logic as appropriate. Sentence processor 121 can call mapping rules engine 150 to process an input or portion of same, for example. The following Table 2 illustrates a set of matching linguistic terms across the different sentence types.

TABLE 2

Example of Language Specific Rules Mapping for English.

| Where | Matching Term | Example sentence |
| --- | --- | --- |
| In metalanguage sentence | "a number" | "here is how to show a number" |
| In trigger sentence | "<number>" | "show <number>" |
| In one of the sentences contained within the semantic rule | "the number" | "print the number" |

Semantic processing unit 120 is configured to call mapping rules engine 150 and determine a trigger sentence from an input metalanguage sentence. If no trigger sentence can be determined from the input, then the metalanguage unit 140 can be configured to request via user interface 110 for a user to specify an example trigger sentence for the semantic rule.

If the trigger sentence is found to match an already existing semantic rule, then semantic processing unit 120 may prompt the user to confirm that the to-be-input semantic rule will replace the already existing one.

Semantic processing unit 120 is configured to store associations between the trigger sentence(s) and corresponding semantic rule(s) to implement the foregoing. The associations can be used by semantic rule engine 122 to select a semantic rule corresponding to a trigger sentence received and execute the semantic rule.

In some embodiments, a semantic rule is defined by at least one valid natural language sentence in a set of ordered valid natural language sentences. Metalanguage unit 140 is configured to provide a prompt to a user, such as via user interface 110, to input the ordered set of sentences. Each sentence is tested for validity by semantic processing unit 120 by using one or more mapping rules engines 150 and sentence processor 121. Mapping rules engine 150 can handle the substitution of linguistic terms in the input sentence and generate a resulting sentence, and sentence processor 121 can test that the resulting sentence is recognized as either a trigger sentence for a semantic rule or a match for an already existing built-in sentence, for example. If the sentence is unable to be validated, then metalanguage unit 140 can prompt the user to adjust or otherwise re-enter an alternate version of the sentence and the validation process is repeated with the new input sentence.

Once all the different inputs have been received and validated, the unit will store them together as a bundle. Specifically, the unit will store the semantic rule, and its optional condition, if any, and its various trigger sentences in the semantic rule database. At this point the process for creating a semantic rule ends.

Figure 4:
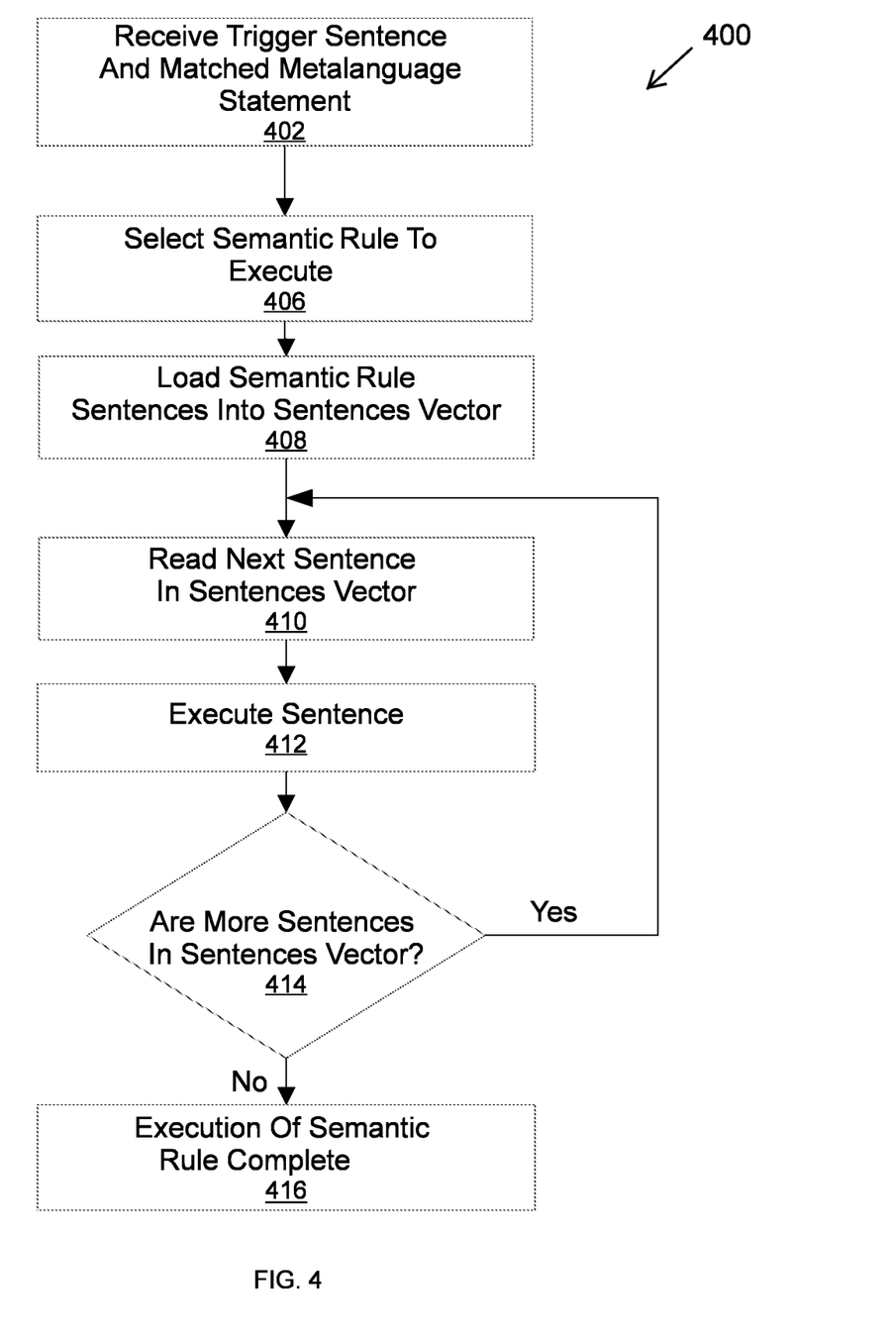
FIG. 4 is a flow diagram of a method for executing a semantic rule, according to some embodiments.

FIG. 4 is a flow diagram of an example method 400 for selecting and executing a semantic rule using an example semantic processing system 100, according to some embodiments. At 402, semantic rule engine 122 receives a trigger sentence from sentence processing unit 121 and a metalanguage sentence matched by sentence processing unit 121. The metalanguage sentence can be selected by sentence processor 121 as a metalanguage sentence that matches an input sentence. The trigger sentence can be the input sentence that includes a portion that matches an existing trigger sentence and a portion that includes one or more variables that can be used in executing the trigger sentence. The metalanguage statement may be used as a reference during matching, validation, or linguistic term processing that can occur during the execution or subsequent execution runs. The variables can be received following processing by sentence processing unit 121. At 406, one or more sentences defining the semantic rule associated with the trigger sentence are selected. At 408, same are loaded into a sentences vector according to some embodiments.

At 410, semantic rule engine 122 is configured to read the next sentence in the sentences vector, and, at 412, semantic rule engine 122 is configured to execute the sentence. The sentence can be executed based on one or more variables associated with the trigger sentence or original input sentence. For example, semantic rule engine 122 (e.g., using mapping rules engine 150) can replace a portion of the sentence to be executed with one or more variables. This can allow a sentence to be executed based on the context or input received, for example. At 414, semantic rule engine 122 checks whether there are more sentences in the sentences vector. If yes, semantic rule engine 122 repeats 410, 412, and 414 iteratively until 414 returns no. If no, at 416, the execution of the semantic rule is complete.

According to some embodiments, semantic processing system 100 implements a process as follows for selecting and executing a semantic rule. Given an input sentence that has already been matched to a metalanguage sentence, semantic processing unit 120 can select an appropriate semantic rule and then semantic rule engine 122 can execute same.

Once a specific metalanguage statement has been selected, the associated set of validated natural language statements (e.g., the semantic rule) is loaded as well as the associated trigger sentence. Then the quartet of metalanguage statement, input statement, trigger sentence, and semantic rule is used by semantic rule engine 122 for execution.

The semantic rule engine 122 receives as input the quartet of: metalanguage statement, input statement, trigger sentence, and semantic rule. It then loads the statements in the semantic rule into memory in an instruction vector and processes and executes each statement in the instruction vector in sequential order.

For each statement, semantic rule engine 122 references the language mapping rules engine 150 and performs linguistic terms substitution as necessary. Specifically, if there are linguistic terms present in the current statement to be executed that match linguistic terms in the trigger sentence, then mapping rules engine 150 is configured to map the corresponding value (e.g., variable) from the input sentence onto the current statement and form a newly constructed statement for execution. The mapping rules engine 150 can be language specific and can map linguistic terms from the general (as specified in the metalanguage when the semantic rule was created) to the more specific as it moves from a trigger sentence to a constructed sentence. The following Table 3 illustrates this linguistic term substitution.

TABLE 3

Example of Linguistic Term Substitution From Trigger Sentence to Constructed Sentence.

| Sentence Type | Example |
| --- | --- |
| Metalanguage sentence | "...calculate the square root of a number" |
| Trigger sentence | "calculate the square root of <number>" |
| Input sentence | "calculate the square root of 100" |
| Current sentence in semantic rule to be executed | "print the number" |
| Actual constructed statement to be executed after linguistic term substitution | "print 100" |

Semantic rule engine 122 can execute the constructed statement or send same to sentence processor 121 for execution. If no linguistic substitutions were made, then the semantic rule engine 122 executes the current statement as is or sends same to the sentence processor for execution.

Semantic rule engine 122 repeats this process until all statements in the semantic rule are processed or it processes a statement that instructs it to halt further processing of the semantic rule. At that point, the execution of the semantic rule has ended. As used herein, a statement can refer to a sentence.

Semantic processing system 100 can enable users to use natural language to create usable language (e.g., machine-readable instructions) in order to direct or cause a computer carry out a specific task. Language that creates other language can be termed a "metalanguage".

Semantic rules executed by a computer can implement completion of a task according to heuristics, algorithms, rules of thumb, instructions, standard operating procedures, and other such things. The semantic rules can be defined using metalanguage.

Semantic rules generated, defined, or executed by semantic processing system 100 can be generated, defined, or executed based on one or more input sentence(s) received from a user or received from another computer. Any input described herein as received from user interface 110 or a user can be instead received from a computer (e.g., a remote server) in some embodiments. Semantic processing system 100 can enable users to talk directly to their computer in a natural language (e.g., via conversational texting) in order to direct the computer to do something. This can improve the ability of a computer to perform computer functions in response to natural language input, such as without requiring a computer programmer to pre-program a desired computer instruction for a particular task or function using a formal computer language or scripting language. Absent semantic processing system 100, there is no direct way to teach a computer a task using natural words and language.

The ability to directly interact with a computer using natural language and semantic rules is analogous to being able to teach the computer a task rather than program it. As such, semantic processing system 100 presents a significant leap forward in the usability of computers without using computer programming.

Semantic processing system 100 is different from language processing software that simply uses pattern matching, parse trees, or machine learning to perform an action or respond to a query that has been input into the system; different from utilitarian software that may attempt to simply combine an existing, programmed operation with a natural language interface; and different from language-related software that may attempt to simply train the software to determine what it needs to perform an action or respond to a query. For example, these other example software requires that there are underlying words that have already been defined in the software, as if there is one official standard language definition and there is some authority that creates it. This can require skilled computer software developers to anticipate a collection of words that are required and create and program software definitions for these words. The resulting software will be limited by the foresight of the software developers, and the end user will correspondingly be limited in their use of the software. Semantic processing system 100 instead allows an end user to create their own lingo, according to some embodiments.

Rather than trying to enable the system to understand the human user in service of a goal, in some embodiments, semantic processing system 100 enables the human user to create their own language and words and directly tell the software what those are in support of a task. That is, semantic processing system 100 can enable human users to specify what their words mean without the use of a dictionary by referring to previously communicated words.

This can allow semantic processing system 100 to enable a computer to use language to create language. Being able to directly talk to their computer will enable users to be significantly more productive in performing their tasks.

Example metalanguage sentences are sentences that can be used to convey a semantic rule. For example, metalanguage sentences can include words such as: "here is how to . . . " or "when <X> happens, do the following", etc.

A semantic rule can include a standard operating procedure (SOP) executable by a computer.

For example, "here is how to checkmate with a rook and a bishop" following by a long series of words and sentences is an example of a semantic rule related to implementing a chess move on a virtual chess game played by the computer.

Another example of a metalanguage sentence for defining a semantic rule is "here is how to login to your bank account when you are on a public computer", which is distinct from the metalanguage sentence, "here is how to login to your bank account from your home computer".

According to some embodiments, semantic processing system 100 implements the following features. Semantic processing system 100 receives and processes sentences using all natural language without requiring atomic operators; can include an initial set of pre-programmed combination of sentences, semantic rules, non-semantic rule functions and implementations; is configured to define generically in the abstract and then map to specific (e.g., based on variable(s) such as contextual inputs or linguistic terms received in an input sentence); and can enable implementation and use without constraint that there be only one language.

According to some embodiments, semantic processing system 100 is configured to receive and process a specific semantic rule that is being proposed within a specific context. Semantic processing system 100 uniquely enables a computer to receive at a user interface 110 metalanguage that can be used to define or generate computer functionality.

According to some embodiments, semantic processing system 100 is not limited to processing only one specific language. Semantic processing system 100 uniquely enables a human user to interact with a computer in one or more languages within the same session, context, task or semantic rule. The human user is also advantageously enabled to define new computer instructions comprising a semantic rule using natural language input.

Various embodiments have been described in detail. Changes in and or additions to the above description may be made. Section headings herein are provided as organizational cues.

What is claimed is:

1. A computer-implemented method for natural language computation, comprising:
   matching an input sentence to a token;
   upon determining a match with the token, the token being a trigger sentence, executing a semantic rule associated with the trigger sentence using the input sentence;
   upon determining a match with the token, the token being a metalanguage sentence, using the input sentence:
      storing a new semantic rule;
      generating one or more defined trigger sentences based on the input sentence, the generating of the one or more defined trigger sentences based on the input sentence being by, for each of the one or more defined trigger sentences, selecting a variable in the input sentence and defining the trigger sentence using the variable; and storing an association between the new semantic rule and the one or more defined trigger sentences;

upon determining a match with the token, the token being a built-in sentence, executing one or more built-in functions associated with the built-in sentence using the input sentence; and displaying a data output at a user interface, the data output representing a result corresponding to the input sentence.

2. The computer-implemented method of claim 1, the token being a trigger sentence, metalanguage sentence, or a built-in sentence.

3. The computer-implemented method of claim 1, the matching being evaluating a match between the input sentence and one or more trigger sentences, then one or more metalanguage sentences, and then one or more built-in sentences until the match is determined.

4. The computer-implemented method of claim 1, further comprising requesting creation of a new trigger sentence, the trigger sentence matching the input sentence.

5. The computer-implemented method of claim 1, the built-in function being selected from the group consisting of: semantic rule, non-semantic rule, metalanguage statement or function, function call, internal operation, synchronous function, asynchronous function, single step call, multi-step call, interactive, non-interactive, remote execution function, local CPU function, database function, web call, network call, cloud call, and any type of software or hardware computer function or instruction.

6. The computer-implemented method of claim 1, the metalanguage sentence representing a request to associate one or more trigger sentences with an existing trigger sentence, the steps further comprising storing an association between the one or more trigger sentences and the semantic rule associated with the existing trigger sentence.

7. The computer-implemented method of claim 1, the storing a new semantic rule further comprising receiving one or more additional input sentences and storing the new semantic rule using the one or more additional input sentences.

8. The computer-implemented method of claim 1, executing the semantic rule being by selecting a selected metalanguage sentence from one or more defined metalanguage sentences, the one or more defined metalanguage sentences corresponding to the trigger sentence.

9. A computer-implemented system for natural language computation, comprising:

a non-transitory computer memory; and at least one processor in communication with the non-transitory computer memory;

wherein the non-transitory computer memory comprises instructions which, when executed by the at least one processor, carries out the steps of:

matching an input sentence to a token;

upon determining a match with the token, the token being a trigger sentence, executing a semantic rule associated with the trigger sentence using the input sentence;

upon determining a match with the token, the token being a metalanguage sentence, using the input sentence:

storing a new semantic rule;

generating one or more defined trigger sentences based on the input sentence, the generating of the one or more defined trigger sentences based on the input sentence being by, for each of the one or more defined trigger sentences, selecting a variable in the input sentence and defining the trigger sentence using the variable; and storing an association between the new semantic rule and one or more defined trigger sentences;

upon determining a match with the token, the token being a built-in sentence, executing one or more built-in functions associated with the built-in sentence using the input sentence; and displaying a data output at a user interface, the data output representing a result corresponding to the input sentence.

10. The computer-implemented system of claim 9, the token being a trigger sentence, metalanguage sentence, or a built-in sentence.

11. The computer-implemented system of claim 9, the matching being evaluating a match between the input sentence and one or more trigger sentences, then one or more metalanguage sentences, and then one or more built-in sentences until the match is determined.

12. The computer-implemented system of claim 9, the steps further comprising requesting creation of a new trigger sentence, the trigger sentence matching the input sentence.

13. The computer-implemented system of claim 9, the metalanguage sentence representing a request to associate one or more trigger sentences with an existing trigger sentence, the method further comprising storing an association between the one or more trigger sentences and the semantic rule associated with the existing trigger sentence.

14. The computer-implemented system of claim 9, the storing a new semantic rule further comprising receiving one or more additional input sentences and storing the new semantic rule using the one or more additional input sentences.

15. The computer-implemented system of claim 9, executing the semantic rule being by selecting a selected metalanguage sentence from one or more defined metalanguage sentences, the one or more defined metalanguage sentences corresponding to the trigger sentence.

16. A non-transitory computer-readable medium containing computer-readable instructions which, when executed by a computer processor, perform a method of:

matching an input sentence to a token;

upon determining a match with the token, the token being a trigger sentence, executing a semantic rule associated with the trigger sentence using the input sentence;

upon determining a match with the token, the token being a metalanguage sentence, using the input sentence:

storing a new semantic rule;

generating one or more defined trigger sentences based on the input sentence, the generating of the one or more defined trigger sentences based on the input sentence being by, for each of the one or more defined trigger sentences, selecting a variable in the input sentence and defining the trigger sentence using the variable; and storing an association between the new semantic rule and one or more defined trigger sentences;

upon determining a match with the token, the token being a built-in sentence, executing one or more built-in functions associated with the built-in sentence using the input sentence; and displaying a data output at a user interface, the data output representing a result corresponding to the input sentence.

\* \* \* \* \*